United States Patent
Kobayashi et al.

(10) Patent No.: US 9,878,606 B2
(45) Date of Patent: Jan. 30, 2018

(54) PLANETARY GEAR MECHANISM AND TRANSMISSION

(71) Applicant: HONDA MOTOR CO., LTD., Tokyo (JP)

(72) Inventors: Heisuke Kobayashi, Wako (JP); Norikazu Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/417,524

(22) Filed: Jan. 27, 2017

(65) Prior Publication Data

US 2017/0240036 A1    Aug. 24, 2017

(30) Foreign Application Priority Data

Feb. 18, 2016 (JP) .................. 2016-028612

(51) Int. Cl.
*F16H 57/08* (2006.01)
*B60K 6/365* (2007.10)
(Continued)

(52) U.S. Cl.
CPC ................ *B60K 6/365* (2013.01); *B60K 6/48* (2013.01); *B60K 6/547* (2013.01); *F16H 1/28* (2013.01); *F16H 37/0806* (2013.01); *F16H 57/0427* (2013.01); *F16H 57/082* (2013.01); *B60K 2006/4825* (2013.01); *B60Y 2200/92* (2013.01); *B60Y 2400/73* (2013.01); *Y10S 903/91* (2013.01); *Y10S 903/919* (2013.01)

(58) Field of Classification Search
None
See application file for complete search history.

(56) References Cited

U.S. PATENT DOCUMENTS 3,365,986 A *  1/1968 Mazziotti ............. B60K 17/046
                                                    180/372
4,158,971 A *  6/1979 Szalai .................. B60K 17/046
                                                    475/343
(Continued)

FOREIGN PATENT DOCUMENTS

JP    50-106571    9/1975
JP    09-210150    8/1997
(Continued)

OTHER PUBLICATIONS

Japanese Office Action dated Aug. 22, 2017, English translation included, 4 pages.

*Primary Examiner* — Justin Holmes
(74) *Attorney, Agent, or Firm* — Rankin, Hill & Clark LLP (57) ABSTRACT

A planetary gear mechanism has a sun gear disposed to a rotating shaft, a plurality of pinion gears, a carrier supporting the plurality of the pinion gears, a ring gear meshing with the pinion gear on the outer diameter side of the carrier and a case holding the ring gear on the outer diameter side thereof. The ring gear is slidable in the axial direction of the rotating shaft with respect to the case. The planetary gear mechanism has a load transmission member abutting to an inner diameter side end portion of the ring gear and holding the carrier and the ring gear so as to be relatively rotatable. The load transmission member transmits an axial load from the ring gear to the carrier.

5 Claims, 5 Drawing Sheets

(51) Int. Cl.
*B60K 6/48* (2007.10)
*B60K 6/547* (2007.10)
*F16H 1/28* (2006.01)
*F16H 37/08* (2006.01)
*F16H 57/04* (2010.01)

(56) References Cited

U.S. PATENT DOCUMENTS

| | | | | |
|---|---|---|---|---|
| 4,968,157 | A | * | 11/1990 | Chiba .................... F16C 19/30 |
| | | | | 384/462 |
| 2010/0151986 | A1 | * | 6/2010 | Burgman ............ F16H 57/0479 |
| | | | | 475/348 |
| 2012/0028748 | A1 | * | 2/2012 | Burgman ............ F16H 57/0479 |
| | | | | 475/159 |
| 2016/0377167 | A1 | * | 12/2016 | Sheridan ............ F16H 57/0471 |
| | | | | 60/226.1 |
| 2017/0122426 | A1 | * | 5/2017 | Miller ...................... F02C 7/36 |

FOREIGN PATENT DOCUMENTS

| JP | 2009-030676 | 2/2009 |
|---|---|---|
| JP | 2013-181634 | 9/2013 |

* cited by examiner

PLANETARY GEAR MECHANISM AND TRANSMISSION

CROSS-REFERENCE TO RELATED APPLICATION

The present disclosure relates to a subject included in Japanese Patent Application 2016-028612 filed dated on Feb. 18, 2016, and, as a whole, the disclosure therein should be incorporated in this application explicitly by reference.

BACKGROUND OF THE INVENTION

Field of the Invention

The present invention relates to a planetary gear mechanism constituting a driving force transmission mechanism for transmitting a driving force from a drive source, and to a transmission provided with the planetary gear mechanism.

Description of the Related Art

Conventionally, a planetary gear mechanism having a sun gear, a pinion gear and a ring gear is available. For example, see Japanese Patent Publication No. 2013-181634 (Patent Document 1). At the center of the planetary gear mechanism, the sun gear as an outer-toothed gear wheel is arranged. The pinion gears as a plurality of small outer-toothed gear wheels mesh with the outer periphery of the sun gear at an equal interval. Further, the outer periphery of the pinion gear meshes with the ring gear as an inner-toothed gear wheel. A rotating shaft of the pinion gear is mounted to a frame referred to as a "carrier". Due to this configuration, the planetary gear mechanism can change driving directions and gear ratios by inputting and outputting using the rotating shafts of the three gears, namely the sun gear, the pinion gear and the ring gear and by fixing the same.

A helical gear having oblique teeth is often used for a gear constituting the planetary gear mechanism. As the helical gear has a wide contact area, the helical gear advantageously transmits a large torque but generates a small noise.

However, when the helical gear is used, a load is applied in the axial direction of the rotating shaft (thrust direction) due to characteristics of the oblique-tooth wheel. Here, as the pinion gear and the ring gear are meshed with each other, a load is applied in the axial directions of the pinion gear and the ring gear. In this case, as the ring gear is fixed to the case of the planetary gear mechanism at an outer peripheral end of the planetary gear mechanism, a load is applied from the ring gear to the case on one hand, and a load is applied from the pinion gear to the carrier fixed in the axial direction on the other hand. In this way, if the ring gear is regarded as a system on the case, the carrier can be regarded as another system on the main shaft as the rotating shaft. Thus, one recognizes the planetary gear mechanism as a structure consisting of two different systems. The planetary gear mechanism consisting of two such different systems may fail to realize followingness of load transmission between these two systems, thereby causing a vibration or a noise.

SUMMARY OF THE INVENTION

The present invention was made in view of an above-mentioned point, and the purpose is to provide a planetary gear mechanism that can suppress a vibration or a noise at the time of movement by improving followingness between components.

Means for Solving the Problems

In order to solve the above-described problems, a planetary gear mechanism (10) in accordance with the present invention includes a sun gear (11) disposed to a rotating shaft (61), a plurality of pinion gears (12) meshing with the outer periphery of the sun gear (11), a carrier (13) supporting the plurality of the pinion gears (12), a ring gear (15) meshing with the pinion gear (12) on the outer diameter side of the carrier (13) and a case (18) holding the ring gear (15) on the outer diameter side thereof. The ring gear (15) is slidable in the axial direction of the rotating shaft (61) with respect to the case (18). At an outer diameter side end portion (13G) of the carrier (13), the planetary gear mechanism (10) has a load transmission member (20) that abuts to an inner diameter side end portion of the ring gear (15) and holds the carrier (13) and the ring gear (15) so as to be relatively rotatable. The load transmission member (20) transmits a load in the axial direction from the ring gear (15) to the carrier (13).

According to this configuration, as the load transmission member (20), abutting to the outer diameter side end portion (13G) of the carrier (13) and the inner diameter side end portion of the ring gear (15) in between, transmits the load in the axial direction from the ring gear (15) to the carrier (13), the ring gear (15) and the carrier (13) move following each other. In this manner, as improvement of followingness between the components enables the ring gear (15) and the carrier (13) to move integrally with each other, the planetary gear mechanism with suppressed vibrations and noises at the time of movement can be provided.

Furthermore, a supporting groove (18M) for supporting the ring gear (15) may be formed to the case (18), and thereby a part of the supporting groove (18M) may be positioned on the outer peripheral side of the load transmission member (20). Thus, the supporting groove (18M) for the ring gear (15) serves also as a groove for supplying lubricating oil, and accordingly the load transmission member (20) properly functions.

Moreover, on the inner diameter side of the load transmission member (20) of the carrier (13) in the above-described planetary gear mechanism (10), a lubricating oil supply groove (13M) for supplying lubricating oil to the load transmission member (20) may be formed. This enables effective supply of lubricating oil to the load transmission member (20), whereby the load transmission member (20) properly functions, and the ring gear (15) and the carrier (13) securely moves following each other.

The carrier 13 is configured by brazing at least two component members (13C, 13G). Namely, the carrier 13 may be configured in the manner that one (13C) of the two members (13C, 13G) is blazed to an inner portion enclosed by the above-described lubricating oil supply groove (13M) formed to the other member (13G). Then, in brazing at the time of manufacture of the carrier (13), the lubricating oil supply groove (13M) for supplying lubricating oil to the above-described load transmission member (20) also functions as a groove for preventing brazing filler metal from leaking.

Furthermore, a transmission (50) for transmitting driving force from the main input shaft (61) to a final output shaft may have an internal combustion engine and an electric motor (MOT) as drive sources and the above-described planetary gear mechanism (10) as a power transmission part. Thus, as described above, by suppressing a vibration and a noise from the planetary gear mechanism (10), the transmission (50) with suppressed vibrations and noises can be provided. It should be noted that the bracketed reference numerals are examples of the elements of the embodiment described later.

According to the planetary gear mechanism in accordance with the present invention, a vibration and a noise at the time of movement can be suppressed by improving followingness between the components.

BRIEF DESCRIPTION OF THE DRAWINGS

FIG. 5A and FIG. 5B are enlarged sectional views of a periphery of a supporting column of a carrier, of which FIG. 5A is a front view of a lubricating oil supply groove and FIG. 5B is a 5B-5B sectional view of FIG. 5A.

DESCRIPTION OF THE EMBODIMENTS

Figure 1:
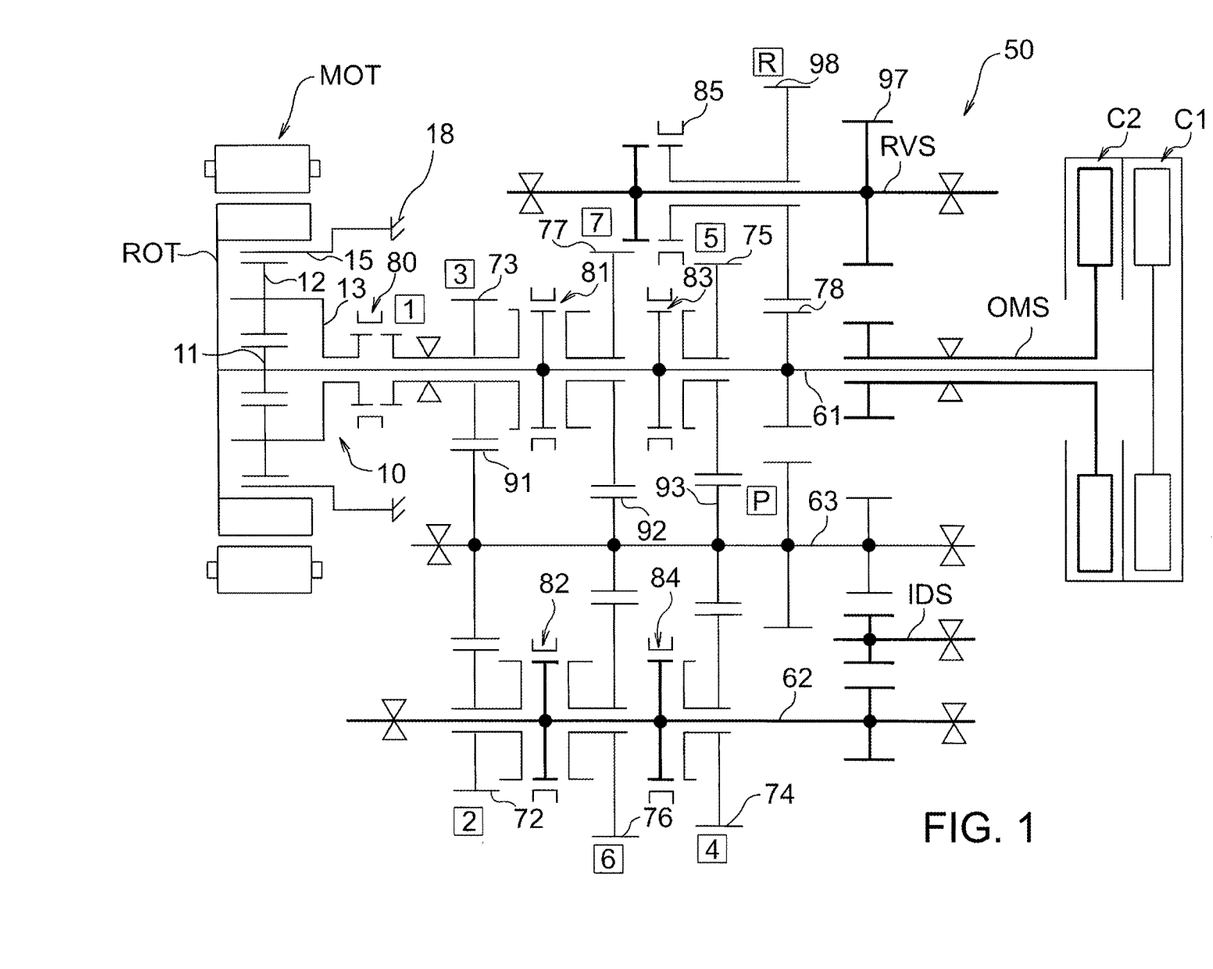
FIG. 1 is a skeleton view of a transmission using a planetary gear mechanism.

An embodiment of the present invention will be described hereinafter with reference to appending drawings. First, a whole configuration of a transmission 50 using a planetary gear mechanism 10 as a power transmission part will be described. FIG. 1 is a skeleton view of the transmission 5 using the planetary gear mechanism 10. The transmission 50 shown in FIG. 1 is a parallel shaft-type transmission with seven forward gears and one reverse gear and also is a dry- and dual clutch-type transmission.

The transmission 50 includes a first input shaft (rotating shaft) 61, a second input shaft 62 and a counter shaft 63 and the planetary gear mechanism 10. The first input shaft (rotating shaft) 61 is connectably/disconnectably connected via a first clutch C1 for odd-numbered shift gears to an internal combustion engine (not shown in the figure). The second input shaft 62 is connectably/disconnectably connected via a second clutch C2 for even-numbered shift gears to the internal combustion engine. The counter shaft 63 is connected, via a shift gear mechanism provided on the first input shaft 61 and the second input shaft 62, to the first input shaft 61 and the second input shaft 62 to generate a rotary output corresponding to a selected one of the shift gears. The planetary gear mechanism 10 is provided on one end of the first input shaft 61. Furthermore, a rotor ROT of an electric motor MOT is fixed to the one end of the first input shaft 61 so as to rotate integrally with the electric motor MOT. The transmission 50 functions as a transmission for a hybrid vehicle with the internal combustion engine and the electric motor MOT as drive sources. The counter shaft 63 is connected to a differential mechanism, which is not shown in the figure, and drives driving wheels of the vehicle.

A well-known configuration may be appropriately used as the shift gear mechanism, which is out of scope of the present invention as the present invention relates to the planetary mechanism 10. Still, in order to understand an outline of the embodiment, first, the shift gear mechanism of the transmission 50 excluding the planetary gear mechanism 10 will be outlined, and next, the planetary gear mechanism 10 will be described.

An outer main shaft OMS is connected to the output side of the second clutch C2. This outer main shaft OMS is arranged concentrically so as to form an external cylinder of the first input shaft 61. The outer main shaft OMS is always in engagement, via an idle shaft IDS, with a reverse shaft RVS and the second input shaft 62 so that a rotary output from the second clutch C2 is transmitted to the reverse shaft RVS and the second input shaft 62. These shafts are parallel to each other.

On the first input shaft 61, a third driving gear 73, a seventh driving gear 77 and a fifth driving gear 75 are concentrically arranged so as to be rotatable relative to each other. A third to seventh gear synchromesh mechanism 81 is arranged between the third driving gear 73 and the seventh driving gear 77 so as to be slidable in the axial direction, and a fifth gear synchromesh mechanism 83 corresponding to the fifth driving gear 75 is arranged so as to slidable in the axial direction.

By sliding one of the synchromesh mechanisms corresponding to a desired shift gear to synchronize and engage the desired shift gear, the shift gear is coupled to the first input shaft 61. These gears and synchromesh mechanisms installed in connection with the first input shaft 61 constitute a first shift gear mechanism for establishing the odd-numbered (or third, fifth and seventh) shift gears.

Each of the driving gears of the first shift gear mechanism meshes with a corresponding one of driven gears installed on the counter shaft 63. Specifically, the third driving gear 73, the seventh driving gear 77 and the fifth driving gear 75 mesh respectively with a first driven gear 91, a second driven gear 92 and a third driven gear 93. The engagement in this manner rotatively drives the counter shaft 63.

In the same manner, on the second input shaft 62, a second driving gear 72, a sixth driving gear 76 and a fourth driving gear 74 are concentrically arranged so as to be rotatable relative to each other. A second to sixth gear synchromesh mechanism 83 is arranged between the second driving gear 72 and the sixth driving gear 76 so as to be slidable in the axial direction, and a fourth gear synchromesh mechanism 84 corresponding to the fourth driving gear 74 is arranged so as to be slidable in the axial direction.

By sliding one of the synchromesh mechanisms corresponding to a desired shift gear to synchronize and engage the desired shift gear, the shift gear is coupled to the second input shaft 62. These gears and synchromesh mechanisms installed in connection with the second input shaft 62 constitute a second shift gear mechanism for establishing the even-numbered (or second, fourth and sixth) shift gears.

Each of the driving gears of the second shift gear mechanism meshes with a corresponding one of driven gears installed on the counter shaft 63. Specifically, the second driving gear 72, the sixth driving gear 76 and the fourth driving gear 74 mesh respectively with the first driven gear 91, the second driven gear 92 and the third driven gear 93. The engagement in this manner rotatively drives the counter shaft 63.

The planetary gear mechanism 10 is arranged at one end, closer to the electric motor MOT, of the first input shaft 61. The planetary gear mechanism 10 includes a sun gear 11, a pinion shaft 12 and a ring gear 15. The sun gear 11 is fixed to the first input shaft 61 and rotates integrally with the first input shaft 61 and the electric motor MOT. The ring gear 15 is fixed to the case 18 of the transmission 50 and configured to generate a shift output from a carrier 13 of the pinion gear 12.

Between the carrier 13 and the third driving gear 73 on the first input shaft 61, a first gear synchromesh mechanism 80 is provided. This first gear synchromesh mechanism 80 is ON in response to selection of the first gear, whereby the carrier 13 is connected to the third driving gear 73 on the first input shaft 61. Then, a rotation of the carrier 13 is transmitted to the gear 73 to rotatively drive the counter shaft 63 via the first driven gear 91. Consequently, a rotation speed of the first input shaft 61 is changed at a gear ratio for the first gear determined by a combination of a gear ratio of the planetary gear mechanism 10 and a gear ratio of the third driving gear 73. Then, the speed-changed rotation is output from a final output shaft (not shown in the figure) via the counter shaft 63.

It should be noted that as the third to seventh gear synchromesh mechanism 81 is at a neutral position at this time, the third to seventh gear synchromesh mechanism 81 remains disengaged with the third driving gear 73. When the second to seventh gears higher than the first gear are selected, the first gear synchromesh mechanism 80 is OFF. Thus, the carrier 13 remains disconnected to the third driving gear 73 and necessarily remains disconnected to the counter shaft 63.

In this manner, the synchromesh mechanism 80 functions as a connecting element provided so as to be connectable/disconnectable to the carrier 13 for selecting a predetermined shift gear and configured to transmit a rotation of the carrier 13 to the counter shaft 63 at the time of connection. Any configuration other than the synchromesh mechanism may be used as such connecting element as far as it realizes a similar function.

The present embodiment has such a configuration that the ring gear 15 is always fixed in the planetary gear mechanism 10, and when a predetermined shift gear (for example, the first gear) is selected, a rotation of the carrier 13 is transmitted via the synchromesh mechanism 80 and the third driving gear 73 to the counter shaft 63. Separated from the third driving gear 73 when a shift gear except the predetermined shift gear is selected, the carrier 13 never rotates accompanied by a rotation of the counter shaft 63, but only rotates according to a rotation of the sun gear 11 in response to a rotation of the first input shaft 61.

Moreover, the ring gear 15 is always fixed and accordingly never rotates. In this manner, never rotating accompanied by the rotation of the counter shaft 63, the carrier 13 can suppress a differential rotation of the planetary gear mechanism 10, in particular, in a higher vehicle speed range with a large workload. Therefore, idling loss can be reduced to a large extent, and also heat generation due to rolling friction can be suppressed. With such reduction and suppression, power transmitting efficiency of the transmission 50 improves as well as fuel economy and cooling performance.

Next, the reverse shaft RVS will be described. A gear 97 in engagement with the idle shaft IDS is fixed to the reverse shaft RVS. In addition, on an outer periphery of the reverse shaft RVS, a reverse gear is provided for selectively connecting the reverse shaft RVS to the first input shaft 61.

The reverse gear is composed of a reverse driving gear 98 provided to the reverse shaft RVS so as to be concentric therewith and rotatable relative thereto, a reverse synchromesh mechanism 85 for selectively connecting the reverse driving gear 98 to the reverse shaft RVS and a gear 78 fixed to the first input shaft 61 so as to mesh with the reverse driving gear 98.

The reverse synchromesh mechanism 85 is slidable in the axial direction of the reverse shaft RVS. The reverse synchromesh mechanism 85 is OFF at the time of forward travel. In other words, the reverse shaft RVS remains disengaged with the reverse driving gear 98. At the time of reverse travel, on the other hand, the reverse synchromesh mechanism 85 is ON, or namely, the reverse shaft RVS is engaged with the reverse driving gear 98.

Figure 2:
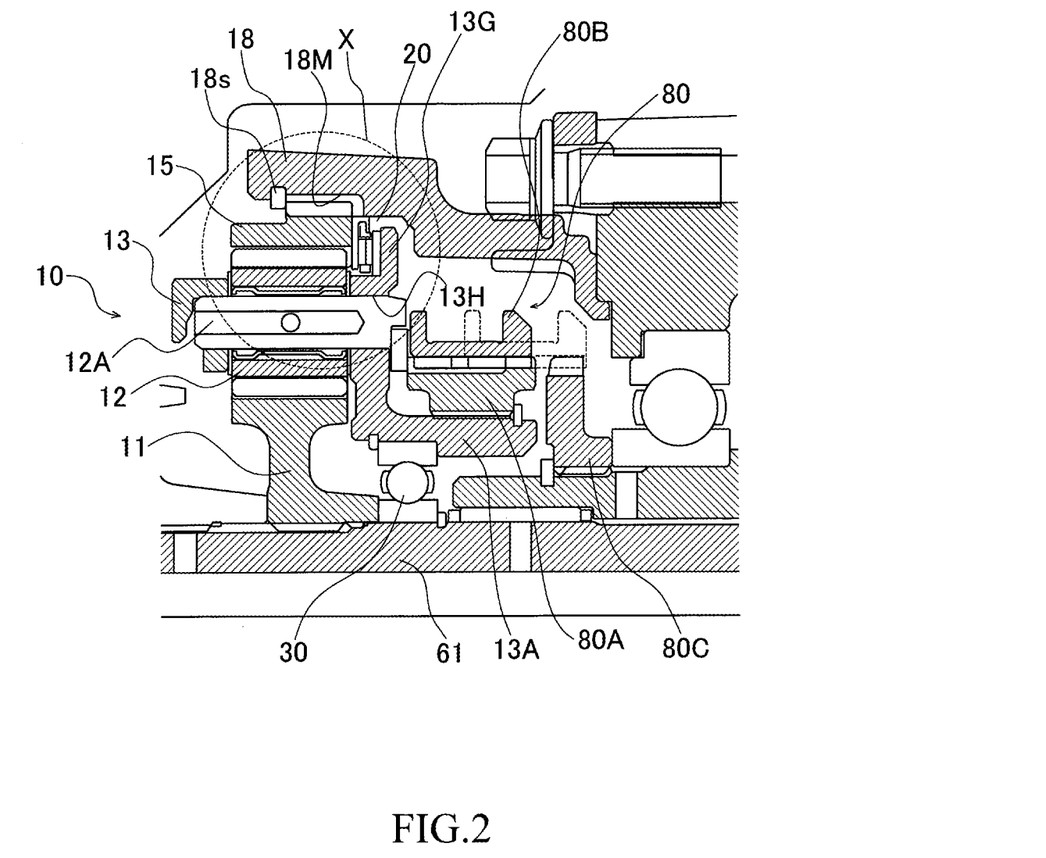
FIG. 2 is an axial sectional view illustrating a planetary gear mechanism in partial enlargement.

A structure of the planetary gear mechanism 10 in the present embodiment will be described. FIG. 2 is an axial sectional view illustrating the planetary gear mechanism in partial enlargement. As shown in FIG. 2, the planetary gear mechanism 10 is disposed adjacent to the first gear synchromesh mechanism 80.

The first gear synchromesh mechanism 80 has a well-known structure. Namely, the synchromesh mechanism 80 has a synchronizer hub 80A, a synchronizer sleeve 80B that rotates integrally with the synchronizer hub 80A by spline-coupling and engages with the synchronizer hub 80A so as to be axially displaceable relative thereto, a dog spline portion 80C and other parts.

Now, a whole configuration of the planetary gear mechanism 10 will be described. The planetary gear mechanism 10 has the sun gear 11 disposed to the first input shaft 61, a plurality of pinion gears meshing with the outer periphery of the sun gear 11, the carrier 13 supporting the plurality of the pinion gears 12, the ring gear 15 meshing with the pinion gear 12 on the outer diameter side of the carrier 13 and the case 18 holding the ring gear 15 on the outer diameter side thereof. Each gear is a oblique-tooth gear (helical gear). Next, each of the components will be described in detail below.

The sun gear 11 is an outer-toothed gear wheel disposed at the center of the planetary gear mechanism 10. The sun gear 11 is axially inserted into one end of the first input shaft 61 to be fixed thereto and assembled so as to rotate integrally with the first input shaft 61. A hub 13A of the carrier 13 is supported by a bearing 30 so as to relatively rotate on an outer periphery of the first input shaft 61. The synchronizer hub 80A of the first gear synchromesh mechanism 80 is assembled to the hub 13A of the carrier 13 to rotate integrally therewith.

The pinion gears 12 are a plurality of outer-toothed gear wheels disposed on the outer periphery of the sun gear 11 at an equal interval so as to mesh with the sun gear 11. A rotating shaft 12A of the pinion gear 12 is mounted to a frame referred to as the "carrier" 13. A bearing hole 13H for supporting the rotating shaft 12A of the pinion gear 12 is formed to the carrier 13.

The ring gear 15 is an inner-toothed gear wheel meshing with the plurality of the pinion gears 12 on the outer periphery thereof. The ring gear 15 is mounted to one end of the case 18, which is annular in shape, so as to be spline-engaged therewith. Thus, the ring gear 15 is fixed to the case 18 so as to be unrotatable relative thereto and slidable thereto in the axial direction of the first input shaft 61. In addition, the ring gear 15 is prevented by a retaining member 18S from dropping out of the case 18.

At an outer diameter side end portion 13G of the carrier 13, a thrust needle bearing 20 (load transmission member) is disposed. The thrust needle bearing 20 abuts to an inner diameter side end portion of the ring gear 15 and holds the carrier 13 and the ring gear 15 so as to be relatively rotatable. Therefore, the outer diameter side end portion 13G of the carrier 13 is formed so as to be projected outward from an outer diameter of the pinion gear 12. The thrust needle bearing 20 transmits an axial load from the ring gear 15 to the carrier 13.

A supporting groove 18M for supporting the ring gear 15 is formed to the case 18 of the planetary gear mechanism 10 so that a part of the supporting groove 18M is positioned on an outer peripheral side of the thrust needle bearing 20. Thus, the supporting groove 18M not only supports the ring gear 15, but also has a function to supply lubricating oil, supplied to the planetary gear mechanism 10, to the thrust needle bearing 20.

Figure 3:
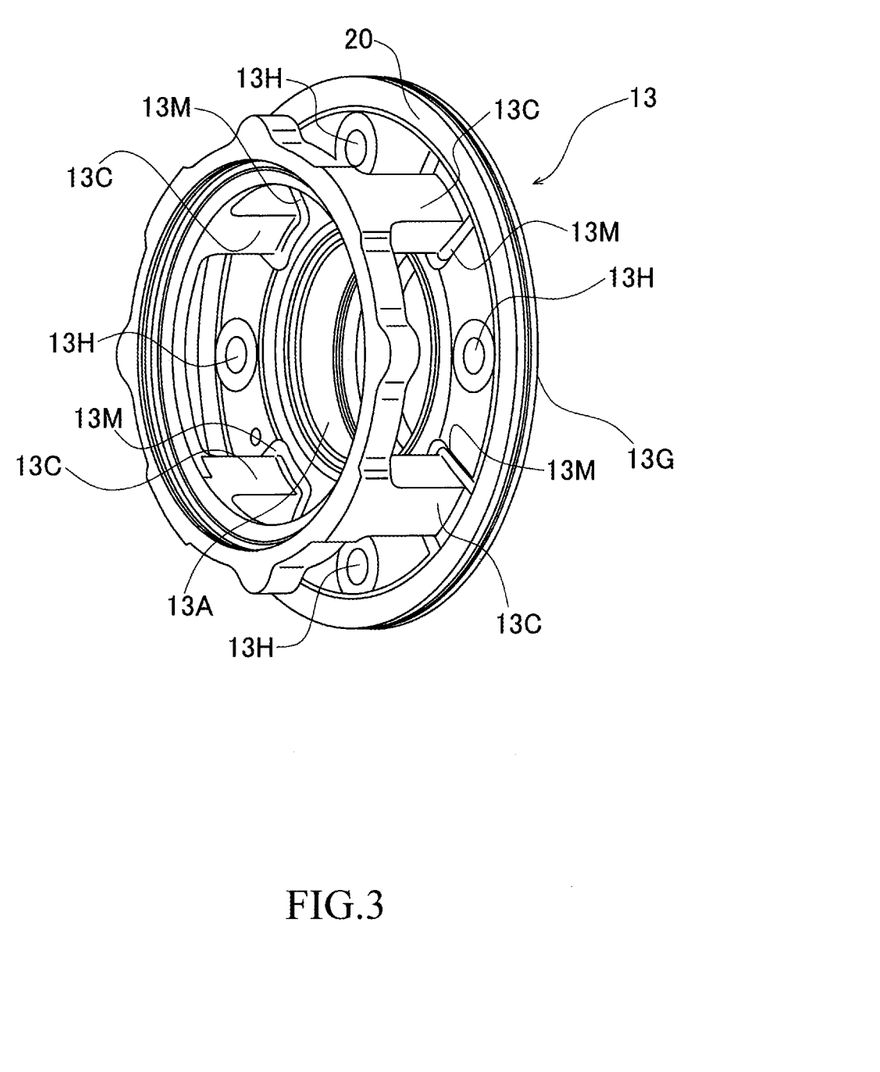
FIG. 3 is a perspective view illustrating a carrier of a planetary mechanism.

Next, a specific configuration of the carrier 13 will be described with reference to figures. FIG. 3 is a perspective view illustrating the carrier 13 of the planetary mechanism 10. FIG. 3 shows the carrier 13 equipped with the thrust needle bearing 20, but omits the other gears, namely, the sun gear 11, the pinion gear 12 and the ring gear 15.

As shown in FIG. 3, an opening portion is formed between four supporting columns 13C of to the carrier 13 of this embodiment so that the four pinion gears 12 can be fixedly disposed to the carrier 13. In addition, the four bearing holes 13H are formed for supporting the rotating shaft 12A disposed to the opening portion in the axial direction. The bearing hole 13H is formed at a regular interval by every 90 degrees in the circumferential direction of the carrier 13. In addition, on the inner diameter side of the thrust needle bearing 20, a lubricating oil supply groove 13M is formed around the supporting column 13C for supplying lubricating oil to the thrust needle bearing 20.

According to the above-described configuration of the planetary gear mechanism 10 of this embodiment, the thrust needle bearing 20, abutting to the outer diameter side end portion 13G of the carrier 13 and the inner diameter side end portion of the ring gear 15 in between, transmits an axial load from the ring gear 15 to the carrier 13. This enables the ring gear 15 and the carrier 13 to move following each other.

Figure 4:
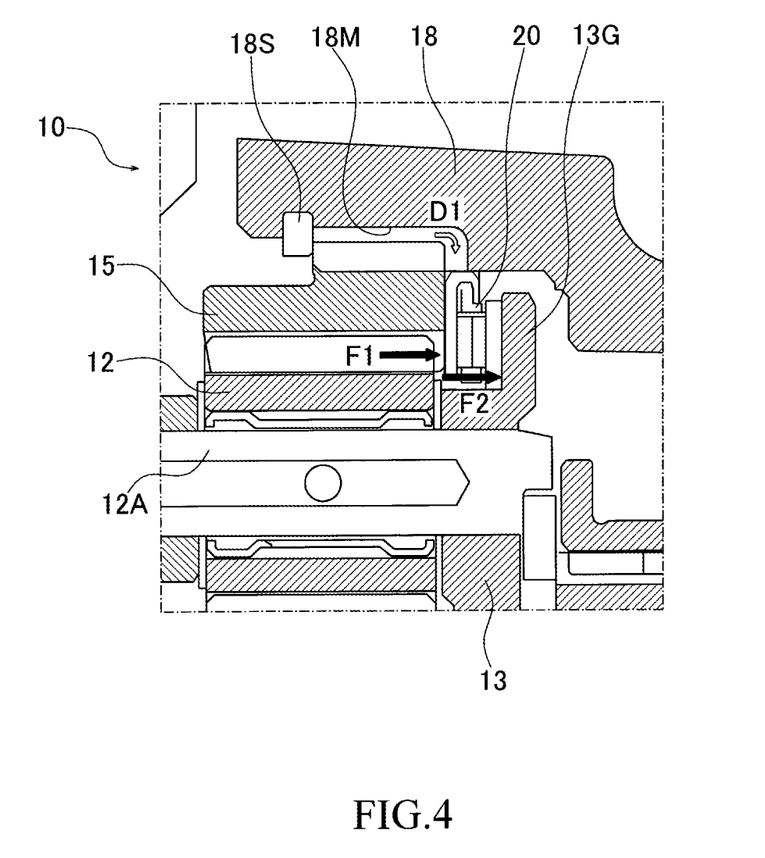
FIG. 4 is an enlarged sectional view illustrating a detailed configuration of a ring gear and a carrier.

This will be described in detail with reference to the figures. FIG. 4 is a sectional view illustrating a detailed configuration of the ring gear 15 and the carrier 13, corresponding to an enlarged view of the X part of FIG. 2. As shown in FIG. 4, due to the helical gear used in the planetary gear mechanism 10 of this embodiment, an axial load acts in the direction of Arrow Fl at a position at which the pinion gear 12 meshes with the ring gear 15. Here, as the right end portion of the ring gear 15 in the figure abuts to the thrust needle bearing 20, as is shown by Arrow F2, the axial load is transmitted via the thrust needle bearing 20 to the outer diameter side end portion 13G of the carrier 13.

In this case, as the supporting groove 18M is formed to the case 18, the ring gear 15 never abuts to the case 18 in the axial direction at a position at which the ring gear 15 and the case 18 are spline-engaged with each other. This prevents the axial load of the ring gear 15 from acting in the axial direction of the case 18.

In this manner, when an axial load occurs at the position at which the pinion gear 12 meshes with the ring gear 15, the load from the ring gear 15 is transmitted to the carrier 13, but not to the case 18, thereby improving the followingness in movements between the ring gear 15 and the carrier 13 and enabling integral movements of the ring gear 15 and the carrier 13. This can suppress a vibration and a noise generated by separate movements of the ring gear 15 and the carrier 13 and also suppress a vibration and a noise at the time of movement of the planetary gear mechanism 10.

Furthermore, the supporting groove 18M for supporting the ring gear 15 is formed to the case 18 so that the part of the supporting groove 18M is positioned on the outer peripheral side of the thrust needle bearing 20. Accordingly, the lubricating oil having entered into the supporting groove 18M moves in the direction indicated by Arrow D1 of FIG. 4 and is finally guided to the thrust needle bearing 20. In this manner, the supporting groove 18M of the ring gear 15 serves also as a groove for supplying lubricating oil. This enables effective supply of lubricating oil to the thrust needle bearing 20 and accordingly secures proper function of the thrust needle bearing 20.

Figure 5A:
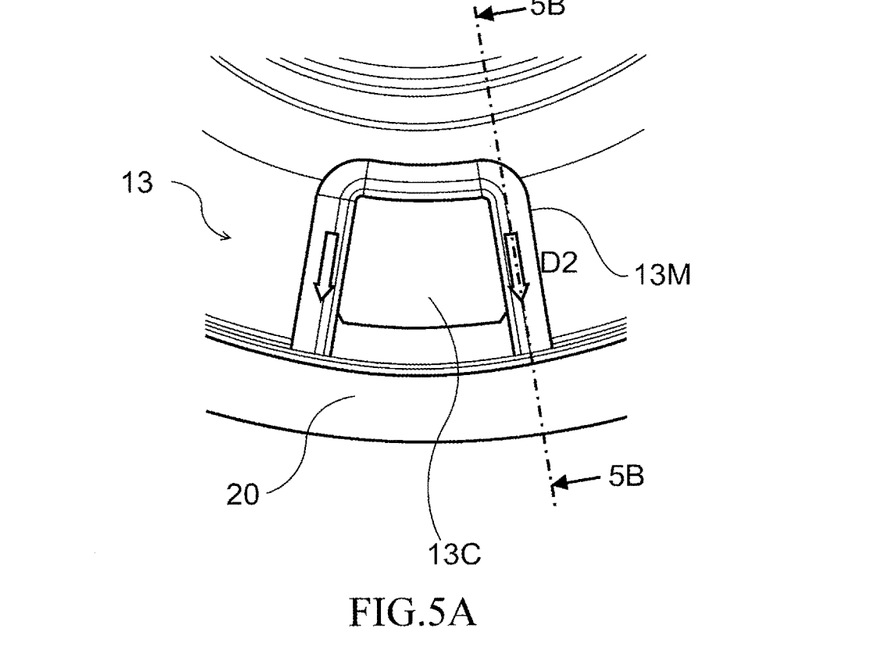
Figure 5B:
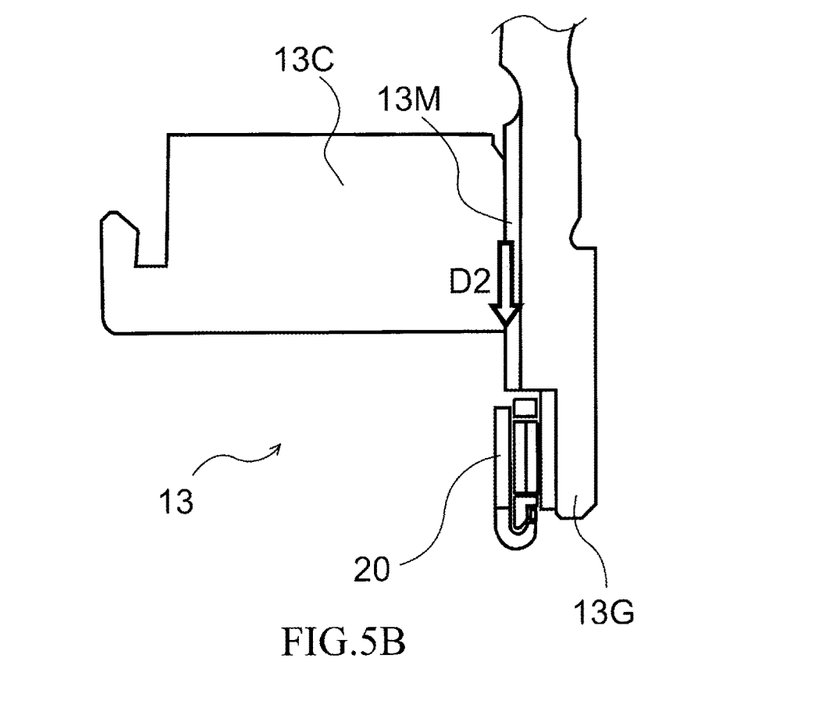

FIG. 5A and FIG. 5B are enlarged sectional views of a periphery of the supporting column of the carrier 13, of which FIG. 5A is a front view of the lubricating oil groove and FIG. 5B is a sectional view of FIG. 5A. As shown in FIG. 5A and FIG. 5B, in this embodiment, on the inner diameter side of the thrust needle bearing 20 of the carrier 13, the lubricating oil supply groove 13M is formed for supplying lubricating oil to the thrust needle bearing 20. Thus, the lubricating oil having entered into the lubricating oil supply groove 13M moves guided in the direction indicated by Arrow D2 of FIG. 5A, thereby enabling effective supply of lubricating oil to the thrust needle bearing 20. This secures proper function of the trust needle bearing 20 and proper following movement of the ring gear 15 and the carrier 13.

Furthermore, the carrier 13 is configured by brazing a plurality of members. In this embodiment, at the time of manufacture of the carrier 13, the supporting column 13C (one member) is brazed to an inner portion enclosed by the lubricating oil supply groove 13M formed to the outer diameter side end portion 13G (the other member). Here, the lubricating oil supply groove 13M functions also as a prevention groove for preventing brazing filler metal from leaking.

Furthermore, in this embodiment, the transmission 50 using the internal combustion engine and the electric motor MOT as drive sources that transmits driving force from the first input shaft 61 to the final output shaft has the above-described planetary gear mechanism 10 as a power transmission part. Accordingly, as described above, by suppressing a vibration and a noise from the planetary gear mechanism 10, the transmission 50 with suppressed vibrations and noises can be provided.

While the embodiments of the invention have been described, it is to be understood that the invention is not limited to the foregoing embodiments. Rather, the invention can be modified to incorporate any number of variations or alterations within the scope of claims and the scope of technical concept described in the specification and the drawings thereof.

What is claimed is:

1. A planetary gear mechanism comprising:
 a sun gear disposed to a rotating shaft;
 a plurality of pinion gears meshing with an outer periphery of the sun gear;
 a carrier supporting the plurality of the pinion gears;
 a ring gear meshing with the plurality of the pinion gears on an outer diameter side of the carrier; and
 a case holding the ring gear on an outer diameter side thereof,
 wherein the ring gear is slidable in an axial direction of the rotating shaft with respect to the case, and
 wherein the planetary gear mechanism has a load transmission member abutting to an inner diameter side end portion of the ring gear, holding the carrier and the ring gear so as to be relatively rotatable and transmitting an axial load from the ring gear to the carrier.

2. The planetary gear mechanism according to claim 1, wherein a supporting groove for supporting the ring gear is formed to the case, and
 wherein a part of the supporting groove is positioned on an outer peripheral side of the load transmission member.

3. The planetary gear mechanism according to claim 1 wherein a lubricating oil supply groove for supplying lubricating oil to the load transmission member is formed on an inner diameter side of the load transmission member of the carrier.

4. The planetary gear mechanism according to claim 3,
wherein the carrier is configured by brazing at least two members, and
wherein an integral configuration of the carrier is achieved by brazing one of the two members to an inner portion enclosed by the lubricating oil supply groove formed to the other member.

5. A transmission comprising:
a drive source including an internal combustion engine and an electric motor; and
a power transmission part transmitting driving force from the drive source to a final output shaft,
wherein the power transmission part includes the planetary gear mechanism according to claim 1.

* * * * *